United States Patent

Kajitani et al.

[11] Patent Number: 6,142,279
[45] Date of Patent: *Nov. 7, 2000

[54] MODULAR CLUTCH CONSTRUCTION

[75] Inventors: Koji Kajitani; Hiroshi Takeuchi; Yasunobu Fukatani; Hiroshi Teramae; Masaaki Asada, all of Neyagawa, Japan

[73] Assignee: Daikin Clutch Corporation, Osaka, Japan

[ * ] Notice: This patent is subject to a terminal disclaimer.

[21] Appl. No.: 09/470,378

[22] Filed: Dec. 22, 1999

Related U.S. Application Data

[62] Division of application No. 09/007,910, Jan. 15, 1998, which is a division of application No. 08/796,896, Feb. 6, 1997, Pat. No. 5,730,266, which is a continuation of application No. 08/546,395, Oct. 20, 1995, Pat. No. 5,645,150, which is a continuation of application No. 08/331,206, Oct. 28, 1994, abandoned, which is a continuation of application No. 08/035,116, Mar. 19, 1993, Pat. No. 5,392,888.

[30] Foreign Application Priority Data

| Mar. 24, 1992 | [JP] | Japan | 4-15427 |
| Apr. 2, 1992 | [JP] | Japan | 4-19769 |
| Apr. 2, 1992 | [JP] | Japan | 4-19770 |
| Apr. 2, 1992 | [JP] | Japan | 4-19771 |

[51] Int. Cl.[7] .................................................. F16D 13/58
[52] U.S. Cl. ........................................ 192/70.16; 192/112
[58] Field of Search ................................ 192/70.16, 112, 192/70.13, 70.11, 89.22, DIG. 1, 70.17

[56] References Cited

U.S. PATENT DOCUMENTS

| 840,742 | 1/1907 | Benn | 192/70.3 |
| 950,164 | 2/1910 | Coates | 192/66.21 |
| 1,016,427 | 2/1912 | Morse | 192/70.12 |
| 1,233,561 | 7/1917 | Dornfiels | 192/70.19 X |
| 5,143,190 | 9/1992 | Westerndorf et al. | 192/70.27 |

*Primary Examiner*—Charles A Marmor
*Assistant Examiner*—Saúl Rodrigues
*Attorney, Agent, or Firm*—Knobbe, Martens, Olson & Bear, LLP

[57] ABSTRACT

Modular clutch construction in which a clutch cover assembly, concentrically containing a pressure plate actuating a clutch disc assembly, is fixed to the flywheel of an engine as a modular unit. The construction improves the modular connection between the clutch cover peripheral wall and the flywheel; in particular through the use of pins to restrain the cover from whirling relative to the flywheel, and by a taking advantage of a method of starter ring-gear installation in which the gear is shrink-fitted over the flywheel with the clutch cover peripheral wall intervening, such that the circumferential end margin of the clutch cover is simultaneously clamped between the ring gear and the flywheel cylindrical surface. The clutch cover is thus secured onto the flywheel in an assembly stage of reduced steps, by comparison with methods employing bolts or other fasteners-as the primary connecting means. The modular connection can further be by matching mortise and tenon forms, or by mutually engaging threads, in corresponding portions of the flywheel and the clutch cover.

5 Claims, 9 Drawing Sheets

6,142,279

MODULAR CLUTCH CONSTRUCTION

This is a divisional application of U.S. patent application Ser. No. 09/007,910, filed Jan. 15, 1998, which is a divisional application of U.S. patent application Ser. No. 08/796, 896, filed Feb. 6, 1997, now U.S. Pat. No. 5,730,266, which is a continuation of U.S. patent application Ser. No. 08/546, 395, filed Oct. 20, 1995, now U.S. Pat. No. 5,645,150, which is a continuation of U.S. patent application Ser. No. 08/331, 206, filed Oct. 28, 1994, now abandoned, which is a continuation of U.S. patent application Ser. No. 08/035,116, filed Mar. 19, 1993, now U.S. Pat. No. 5,392,888.

BACKGROUND OF THE INVENTION

The present invention relates to a modular clutch construction, particularly to a modular clutch construction wherein the peripheral wall of a clutch cover is marginally fitted at one end onto the cylindrical surface of a flywheel.

A conventional clutch comprises mainly a clutch cover assembly retaining a pressure plate fixed to a flywheel, and a clutch disc assembly located between the flywheel and the pressure plate of the clutch cover assembly.

The clutch cover end extends radially outward in a flange, and the clutch cover assembly thus is mounted to the flywheel by fixing the flange to an end face thereof, Therein, the outside diameter of the flywheel must be larger than that of the clutch disc assembly by the radial width of the flange.

Japanese Utility Model Provisional Number No. 1762 of 1975 discloses a clutch cover attachment structure for minimization of flywheel dimensions, wherein the peripheral wall of the clutch cover is circumferentially assembled onto the cylindrical surface of the flywheel. The outer diameter of the flywheel is on the order of that of the clutch cover, since the flange of a conventional clutch cover is eliminated.

In the foregoing, bolts fix the clutch cover peripheral wall to the flywheel cylindrical surface. Due to the curvature of the flywheel cylindrical surface, the area of contact in seating the fixing bolts is limited. Consequently, retaining friction between the surfaces is insufficient, such that the bolts tend to loosen and portions in seating contact tend to wear. Moreover, shearing forces on the clutch cover act directly upon the bolts, occasionally breaking them off. A solution to this problem is to increase the number of bolts; however, a larger number of bolts adds complexity to the assembly stage.

Furthermore, the clutch cover tends to expand radially outward under centrifugal force generated by rotation of the flywheel. As a result, there is a load on the bolts fastening the clutch cover to the flywheel, which tends to loosen them.

SUMMARY OF THE INVENTION

In a modular clutch construction wherein the peripheral wall of a clutch cover is fixed onto the cylindrical surface of a flywheel, it is an object of the present invention that the clutch cover be secured to the flywheel without increasing steps in the clutch assembly stage.

It is another object of the present invention to prevent clutch cover fastening bolts from loosening and corresponding contact surfaces from wearing, in such a modular clutch construction.

(1) A clutch construction according to one aspect of the present invention comprises a flywheel one end face of which is connectable to a corresponding member of an engine for power input; a clutch cover assembly, including a clutch cover circumferentially encompassing and assembled to the cylindrical surface of the flywheel, and a coaxial pressure plate facing the opposite end face of the flywheel; a coaxial clutch disc assembly disposed between the pressure plate and the flywheel; and a ring gear circumferentially fitted onto the peripheral surface of the clutch cover radially outward of its assembly to the flywheel cylindrical surface, such that it is fixed together with both as a module.

In this clutch construction, fitting the ring gear over the flywheel cylindrical surface is accomplished with the clutch cover peripheral wall intervening; consequently, the end margin of the clutch cover is simultaneously clamped between the ring gear and the flywheel cylindrical surface. Thus the clutch cover is secured onto the flywheel cylindrical surface in an assembly stage of reduced steps.

(2) A clutch cover assembly according to another aspect of the present invention comprises a flywheel one end face of which is connectable to a corresponding member of an engine for power input, and the same end face has a circumferentially peripheral bulge protruding axially; a clutch cover assembly, including a clutch cover which encompasses the flywheel and has a flywheel-directed rim portion, bent so as to marginally hold the power-input end face of the flywheel, caulked to the flywheel peripheral bulge, and further provided with retaining elements fixed to the flywheel end face. The clutch cover assembly further includes a coaxial pressure plate facing the opposite end face of the flywheel, and a coaxial clutch disc assembly disposed between the pressure plate and the flywheel.

Wherein the clutch cover is fixed to the flywheel according to the foregoing, the clutch cover peripheral wall wraps the flywheel cylindrical surface, and the clutch cover rim portion is bent over and caulked to the flywheel peripheral bulge, with the clutch cover rim portion retaining elements therein fixed to the flywheel lateral surface. Consequently, steps at the corresponding stage of assembly are reduced because the clutch cover is secured to the flywheel cylindrical surface without the use of fixing bolts.

(3) A clutch device according to a further aspect of the present invention comprises a flywheel, one end face of which is connectable to a corresponding member of an engine for power input, having at fixed radial intervals along its cylindrical surface a plurality of mortise recesses, each of which forms a flat axially extending seat; a clutch cover assembly, including a coaxial pressure plate facing the opposite end face of the flywheel; a coaxial clutch disc assembly disposed between the pressure plate and the flywheel; and fixing means. The clutch cover has tenon portions, formed-on an end of the cover directed toward the flywheel, each of which engages with a corresponding flywheel mortise recess. The fixing means secure the clutch cover tenon portions to the flywheel mortise recesses with which they are engaged.

In assembly, the clutch cover tenon portions are engaged with the flywheel mortise recesses in the axial direction, and are then secured to the mortise recesses by the fixing means, which can be bolts. The mortise recesses provide flat seats, corresponding to the tenon portions for full contact therewith, furthermore providing greater surface area for the contact of bolts as a fixing means. Retaining friction therein is thus sufficient to prevent the bolts from loosening, and the contact portions from wearing.

(4) A clutch device according to yet another aspect of the present invention comprises a flywheel, one end face of which is connectable to a corresponding member of an engine for power input; a clutch cover assembly, including a clutch cover and a coaxial pressure plate facing the opposite end face of the flywheel; and a coaxial clutch disc assembly disposed between the pressure plate and the flywheel. A circumferentially peripheral portion of the end face adjacent the pressure plate is an axially projecting rim; and an engine-ward margin along an end of the clutch cover is installed into the inner surface of the flywheel projecting rim, with which it corresponds circumferentially.

With this modular construction, the clutch cover flange for attachment to the flywheel is eliminated. Furthermore, since the clutch cover is restrained against radially outward expansion by the flywheel rim, fasteners such as bolts are therein unnecessary.

The foregoing and other objects and advantages of the present invention will become more apparent from the following detailed description.

DESCRIPTION OF PREFERRED EMBODIMENTS

Figure 1:
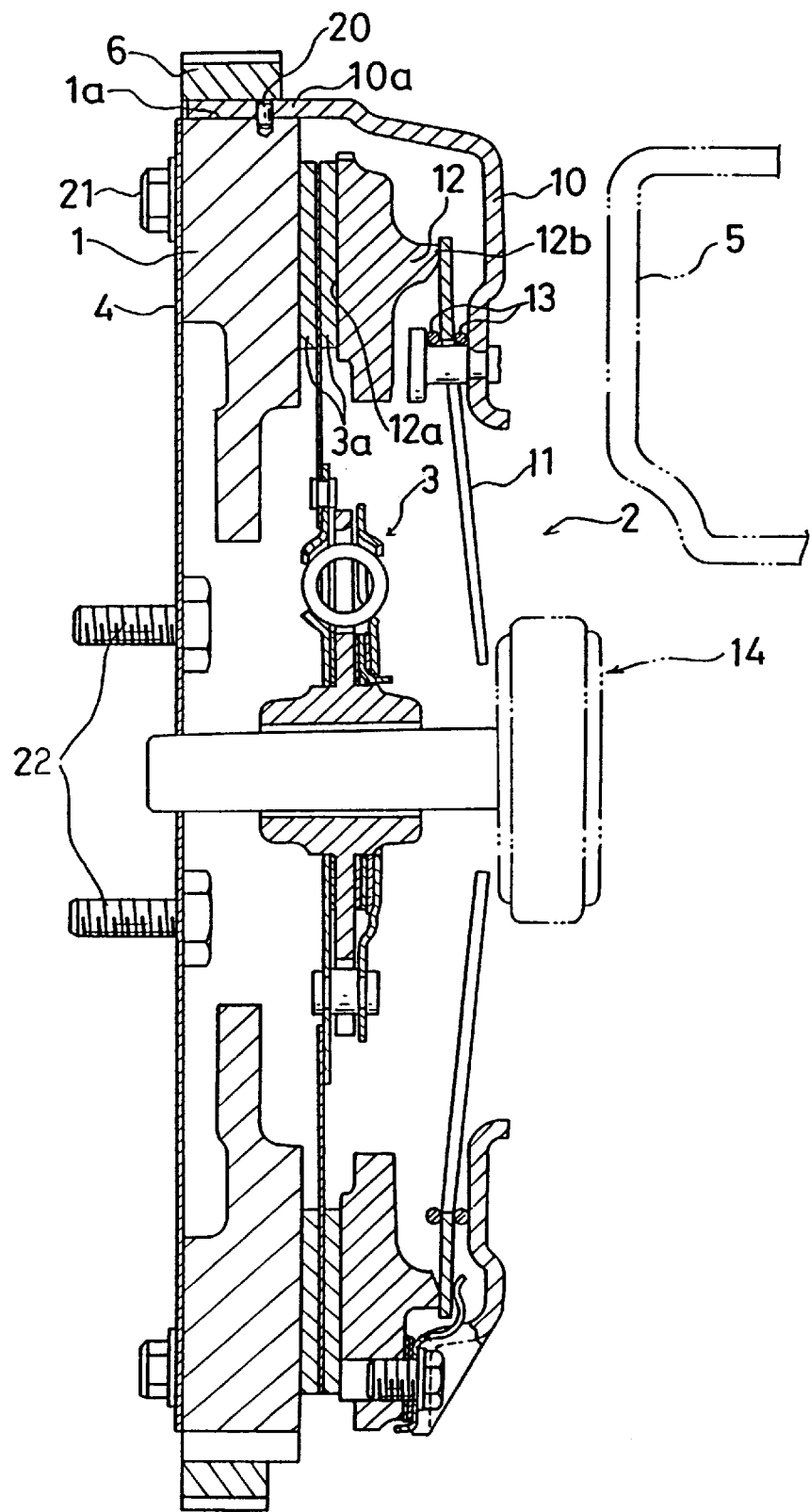
FIG. 1 is a cross-sectional view of a clutch construction according to a first embodiment of the present invention.
Figure 2:
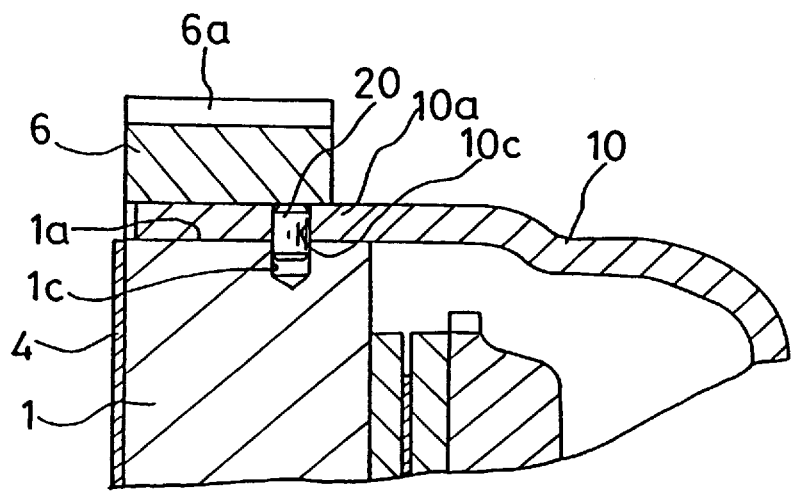
FIG. 2 is a sectional partial view of the clutch construction.

Referring to FIG. 1, a modular clutch construction is shown to comprise mainly a flywheel 1, a clutch cover assembly 2 and a clutch disc assembly 3. A flexible plate 4 is provided on an engine-ward side, for attaching the clutch to the corresponding engine member, the clutch thus being located between the flexible plate 4 and a transmission front housing 5.

The flywheel 1 is an annular member, having one end face connected to the flexible plate 4, wherein the opposite end face constitutes a friction surface onto which the clutch disc is pressed.

The clutch cover assembly 2 includes a clutch cover 10, a diaphragm spring 11 and an annular pressure plate 12 located within the clutch cover 10.

Figure 3:
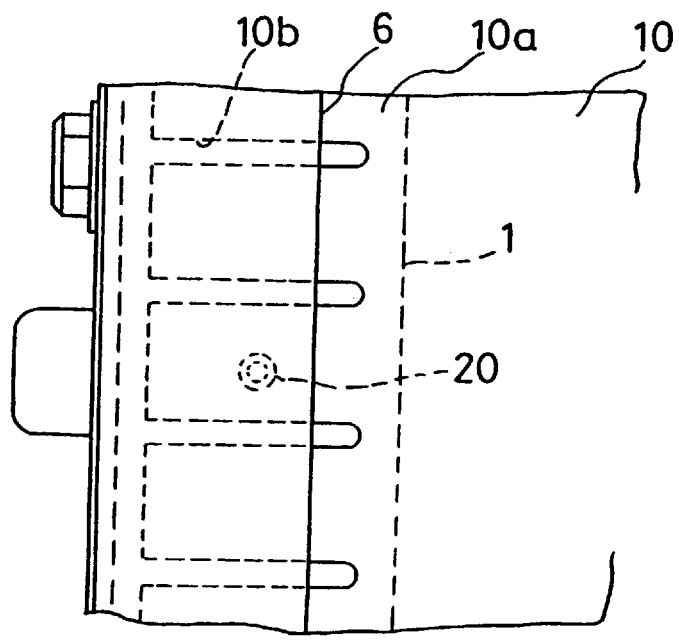
FIG. 3 is a top partial view of the clutch construction.

The clutch cover is formed as a dish having a large-diameter central opening. Peripheral wall 10a of the clutch cover 10 extends axially toward the engine (leftward in FIG. 1) and is fitted onto a cylindrical surface 1a of the flywheel 1. Along the interior surface of the peripheral wall 10a at the end of the clutch cover 10 are, as shown in FIG. 3, a plurality of axially extending, circumferentially spaced slits 10b.

A ring gear 6 is shrink-fitted onto the outer surface of the clutch cover 10 peripheral wall 10a. The ring gear 6 is provided with circumferentially peripheral teeth 6a, with which the pinion of a starter motor is engagable. The clutch cover 10 peripheral wall 10a and the flywheel 1 cylindrical surface 1a are provided with, respectively, holes 10c and 1c, wherein a whirling restraint pin 20 is inserted into each set of holes 10c and 1c.

The diaphragm spring 11 is a disc concentric with the clutch cover 10. Its radially middle portion is supported by the clutch cover 10 through wire rings 13, and its radially outer portion elastically compels the pressure plate 12 toward the flywheel 1, pressing on a plurality of projections 12b thereof. The radially inner margin of the diaphragm spring 11 is in contact with a release assembly 14, wherein when the release assembly 14 presses the radially inner margin of the diaphragm spring 11 toward the engine (toward the left in the figure), clutch engagement is released.

The clutch disc assembly 3 includes fiction facings 3a along its radially outer margin, which become clamped between the friction surface of the flywheel 1 and a pressing surface 12a of the pressure plate 12.

Next, the assembly procedure of the clutch construction of the foregoing embodiment of the present invention will be explained.

First, the diaphragm spring 11 and the pressure plate 12 are installed into the clutch cover 10, whereby the clutch cover assembly 2 is assembled. The clutch disc assembly 3 is also assembled, and then it and the flywheel 1 are positioned inside the clutch cover assembly 2. At this time, the holes 10c of the clutch cover 10 are each aligned with the corresponding holes 1c of the flywheel 1 and then a pin 20 is inserted into each set of holes 10c/1c, whereby the flywheel 1 is fastened to the clutch cover assembly 2.

At this stage, the ring gear 6 is heated. The clutch cover 10 and the flywheel 1 are cooled, if necessary. The ring-gear 6, having an expanded inside diameter due to the heat, is located around the clutch cover 10, and is circumferentially shrink-fitted onto the exterior of the peripheral wall 10a of the clutch cover 10. Therein, even if the inside diameter of the outer peripheral wall 10a is somewhat greater than the outside diameter of the flywheel 1 (for example, due to manufacturing imperfections), the clutch cover 10 will nevertheless be secured onto the flywheel 1. The reason is that due to the plurality of slits 10b along the interior margin of the clutch cover 10 outer peripheral wall 10a, the outer peripheral wall 10a becomes crimped inward radially and pressed tightly onto the flywheel cylindrical surface 1a by the contraction of the ring gear 6 along its inside diameter.

After the clutch construction is assembled as described above, the flywheel 1 is brought into contact with the flexible plate 4 and the two parts are coupled together by bolts 21. Windows formed in the transmission housing provide access for an assembler to tighten the bolts 21. The flexible plate 4 is previously fixed to an engine crankshaft through bolts 22, before it is coupled with the flywheel 1.

Thus as detailed in the foregoing, fixing the ring gear 6 to the clutch cover 10 simultaneously fixes the construction to the flywheel 1. Additionally, the entire circumferential margin of the clutch cover 10 is fitted onto the flywheel 1, which assemblage is stronger and longer-lasting than is a construction wherein a plurality of bolts are used as fasteners.

Moreover, the elimination of bolts or similar fasteners lowers manufacturing costs and reduces the overall weight of the construction.

[Modifications]

Figure 4:
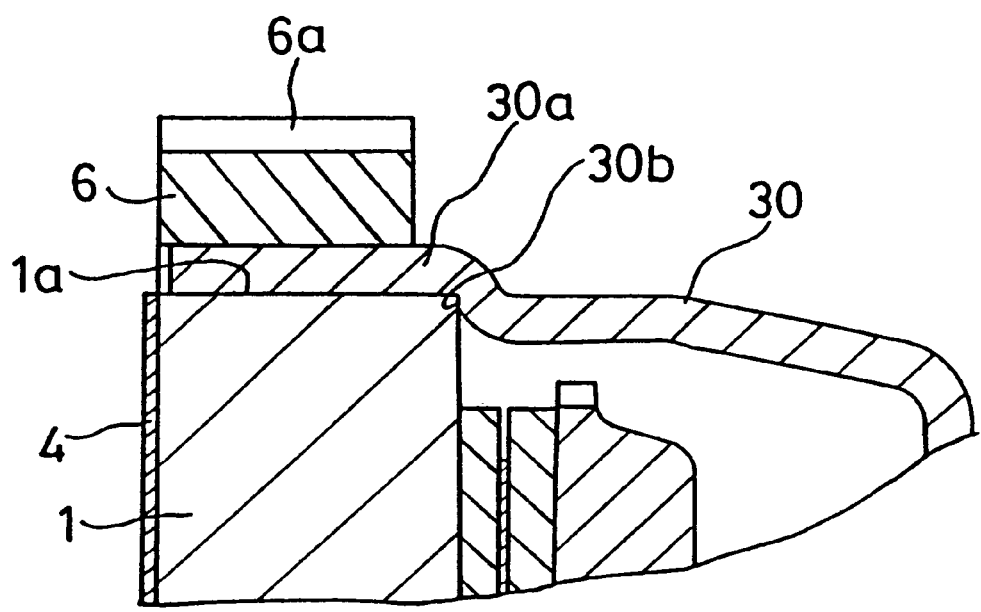
FIG. 4 is a modification of the clutch construction, corresponding to FIG. 2.

(a) In the above-described embodiment, the position of the clutch cover 10 relative to the flywheel 1 axially is set by the pins 20 inserted into the clutch cover 10 holes 10c and the flywheel 1 holes 1c. In the structure shown in FIG. 4, the clutch cover 30 peripheral wall 30a is alternatively provided with an abutment 30b where the wall is stepped radially inward. The abutment 30b is machined such that the flywheel 1 friction-surface end face will abut against the abutment 30b, establishing the relative position of the flywheel 1 and the clutch cover 30 axially when the clutch cover 30 is fitted onto the flywheel 1. Thus with this modification, the pins 20 used in the foregoing embodiment are unnecessary.

(b) The inside surface of the clutch cover 10 and/or the outside surface of the flywheel 1 can be knurled in order to increase the frictional force between the clutch cover 10 and the flywheel 1 cylindrical surface.

(c) In the foregoing embodiment, the present invention is incorporated in a push-type clutch; however, the present invention can be applied to a pull-type clutch as well.

Second Embodiment

Figure 5:
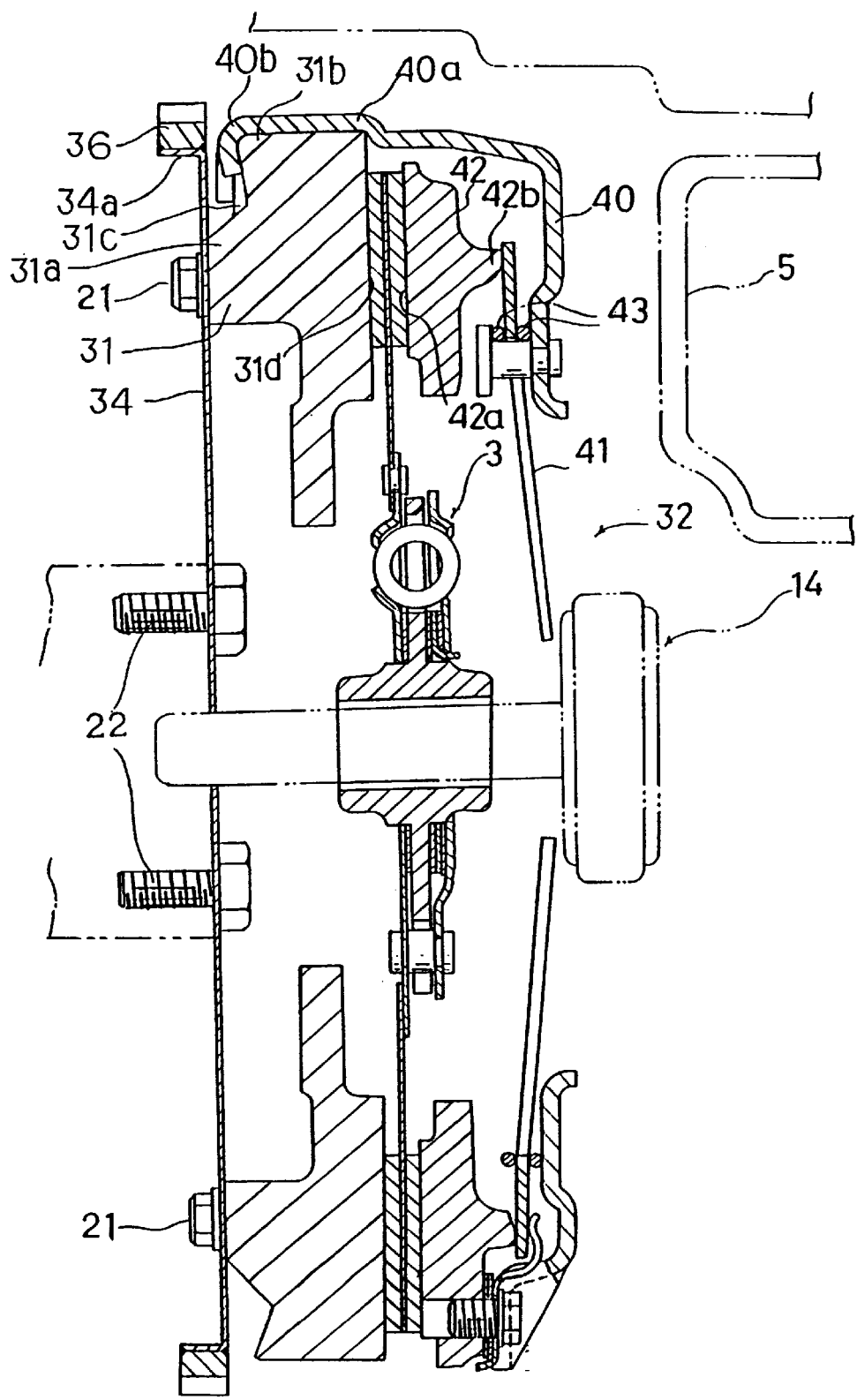
FIG. 5 is a cross-sectional view of a clutch construction according to a second embodiment of the present invention.

A modular clutch construction as shown in FIG. 5 mainly comprises a flywheel 31, a clutch cover assembly 32, and a clutch disc assembly 3. A flexible plate 34 is provided on an engine-ward side, for attaching the clutch to the corresponding engine member, the clutch thus being located between the flexible plate 34 and a transmission front housing 5.

The flywheel 31 is an annular member, and its engine-ward end face is formed to have a portion 31a (detailed in FIG. 7) for attaching the flexible plate 34. The end face of the flywheel 31 also has a circumferentially peripheral bulge 31b protruding toward the engine, and pedestals 31c to which the clutch cover 40 is fixed. As enlargedly shown in FIG. 7, axial protrusion of the peripheral bulge 31b increases in extent in the direction of increasing flywheel radius. The pedestals 31c are located at fixed radial intervals, each having a flat face with a central hole. The opposite end face of the flywheel 31 is a friction surface 31d against which the clutch disc assembly 3 presses. A ring gear 36 is circumferentially fixed onto a retaining rim 34a of the flexible plate 34.

The clutch cover assembly 32 is composed by a clutch cover 40, coaxially containing a diaphragm spring 41 and an annular pressure plate 42.

Figure 6:
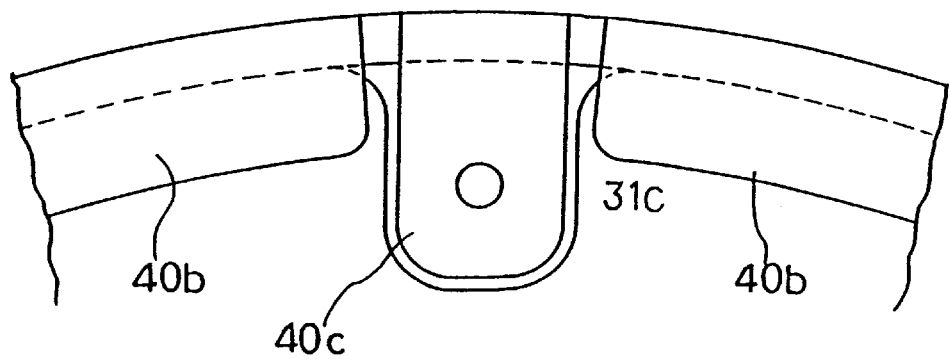
FIG. 6 is a partial end view of the clutch construction.
Figure 7:
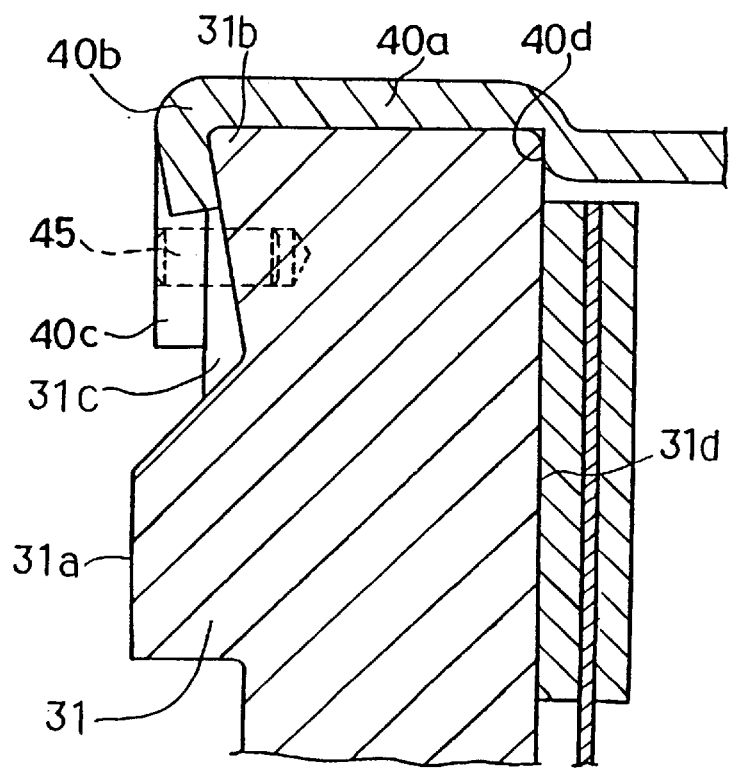
FIG. 7 is a sectional partial view of the clutch construction.

The clutch cover 40 is formed as a dish having a large-diameter central hole. Peripheral wall 40a of the clutch cover 40 extends axially toward the engine, and is provided along its rim with, as shown in FIGS. 6 and 7, caulking portions 40b at fixed radial intervals in alternation with retaining elements 40c.

The caulking portions 40b are bent radially inward so as to clamp the peripheral bulge 31b of the flywheel 31. The retaining elements 40c extend radially inward further than the caulking portions 40b and are bent almost 90° relative to the peripheral wall 40a. Each of the retaining elements 40c is fixed to a corresponding pedestal 31c of the flywheel 31 by a pin 45. Further, the peripheral wall 40a is stepped radially inward to form an abutment 40d on the interior surface. The abutment 40d is machined such that it abuts against the friction surface end face of the flywheel 31, establishing the relative position of the flywheel 31 and the clutch cover 40 axially when the clutch cover 40 is fitted onto the flywheel 31 cylindrical surface.

The diaphragm spring 41 is a disc concentric with the clutch cover 40. Its radially middle portion is supported by the clutch cover 40 through wire rings 43, and its radially outer portion elastically compels the pressure plate 42 toward the flywheel 31, pressing on a plurality of projections 42b thereof. The radially inner margin of the diaphragm spring 41 is in contact with a release assembly 14, wherein when the release assembly 14 presses the radially inner margin of the diaphragm spring 41 toward the engine (toward the left in the figure), the clutch engagement is released.

Next, the assembly procedure of the clutch of the present embodiment will be explained.

First, the diaphragm spring 41 and the pressure plate 12 are installed into the clutch cover 40, whereby the clutch cover assembly 32 is assembled. The clutch disc assembly 3 is also assembled, and then it and the flywheel 31 are positioned inside the clutch cover assembly 32. At this time, the circumferential margin of the end face of the flywheel 31 abuts against the abutment 40d of the clutch cover 40, thereby setting the axial positioning of both parts relative to each other. It should be noted that the corresponding holes in the clutch cover 40 and in the flywheel 31 for the pins 45 are to be brought into alignment.

A caulking device is used for roll-caulking of the rimward margin of the peripheral wall 40a of the clutch cover 40, which is initially straight. Each of the caulking portions 40b of the clutch cover 40 are bent so as to clamp the peripheral bulge 31b of the flywheel 31. Each of the retaining elements 40c are bent by approximately 90° so as to be pressed flush against a corresponding pedestal 31c of the flywheel 31. Then, a pin 45 is inserted to each set of corresponding holes in the pedestals 31c and the retaining elements 40c in order to check the clutch cover 40 against whirling relative to the flywheel 31. Thus, according to the foregoing, the flywheel 31 and clutch cover 40 are integrally joined as a modular clutch construction.

After the clutch construction is assembled as described above, the flywheel 1 is brought into contact with the flexible plate 4 and the two parts are coupled together by bolts 21. Windows formed in the transmission housing provide access for an assembler to tighten the bolts 21. The flexible plate 4 is previously fixed to an engine crankshaft through bolts 22, before it is coupled with the flywheel 1.

Since the peripheral wall 40a of the clutch cover 40 is thus caulked to the circumferential margin of the flywheel 31 end face and the two parts are fixed together by the pins 45, the clutch cover 40 is consequently secured to the flywheel 31.

Moreover, the elimination of bolts or similar fasteners reduces the overall weight. In this embodiment, knock pins are unnecessary, because the relative axial positioning of the flywheel 31 and the clutch cover 40 is set by the abutment 40d of the clutch cover 40, thereby reducing manufacturing costs.

[Modifications]

(a) The inside surface of the clutch cover 10 and/or the outside surface of the flywheel 1 can be knurled in order to increase the frictional force between the clutch cover 10 and the flywheel 1 cylindrical surface.

(b) In the foregoing embodiment, the present invention is incorporated in a push-type clutch; however, the embodiment can be alternatively applied to a pull-type clutch.

Third Embodiment

Figure 8:
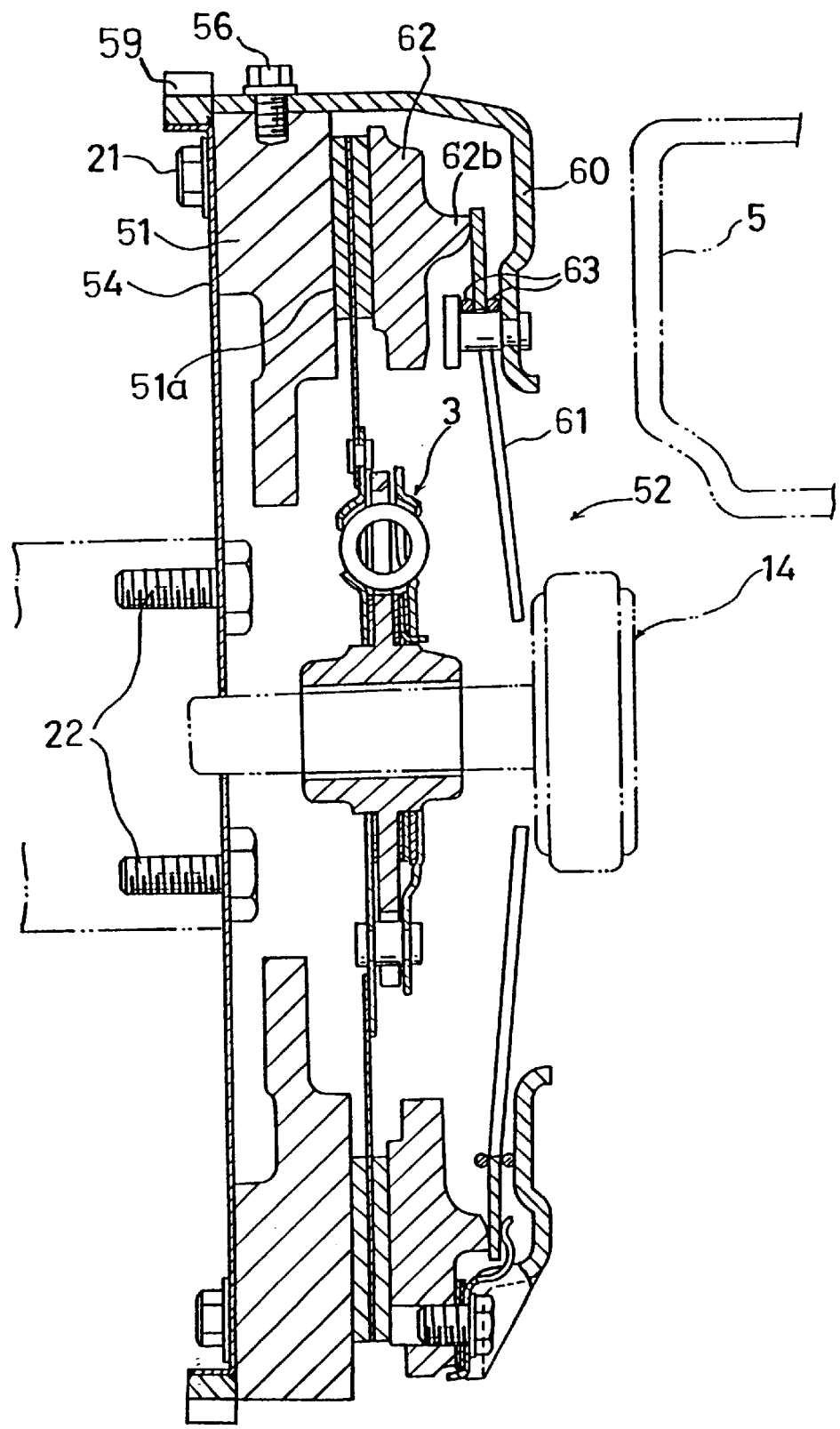
FIG. 8 is a cross-sectional view of a clutch construction according to a third embodiment of the present invention.

A modular clutch construction as shown in FIG. 8 mainly comprises a flywheel 51, a clutch cover assembly 52 and a clutch disc assembly 3. A flexible plate 54 is provided on an engine-ward side, for attaching the clutch to the corresponding engine member, the clutch thus being located between the flexible plate 54 and a transmission front housing 5.

The flywheel 51 is an annular member, and its engine-ward end face is connected to the flexible plate 54 and the opposite end face is a friction surface 51a against which the clutch disc assembly 3 presses. As enlargedly shown in FIG. 9, the cylindrical surface 51a of the flywheel 51 is formed with a plurality of mortise recesses 51b at fixed radial intervals. Each of the mortise recesses 51b forms an axially flat seat and has a tapped hole 51c in the center. A ring gear 59 is circumferentially disposed on a retaining rim of the flexible plate 54.

The clutch cover assembly 52 is composed by a clutch cover 60, coaxially containing a diaphragm spring 61 and an annular pressure plate 62.

Figure 9:
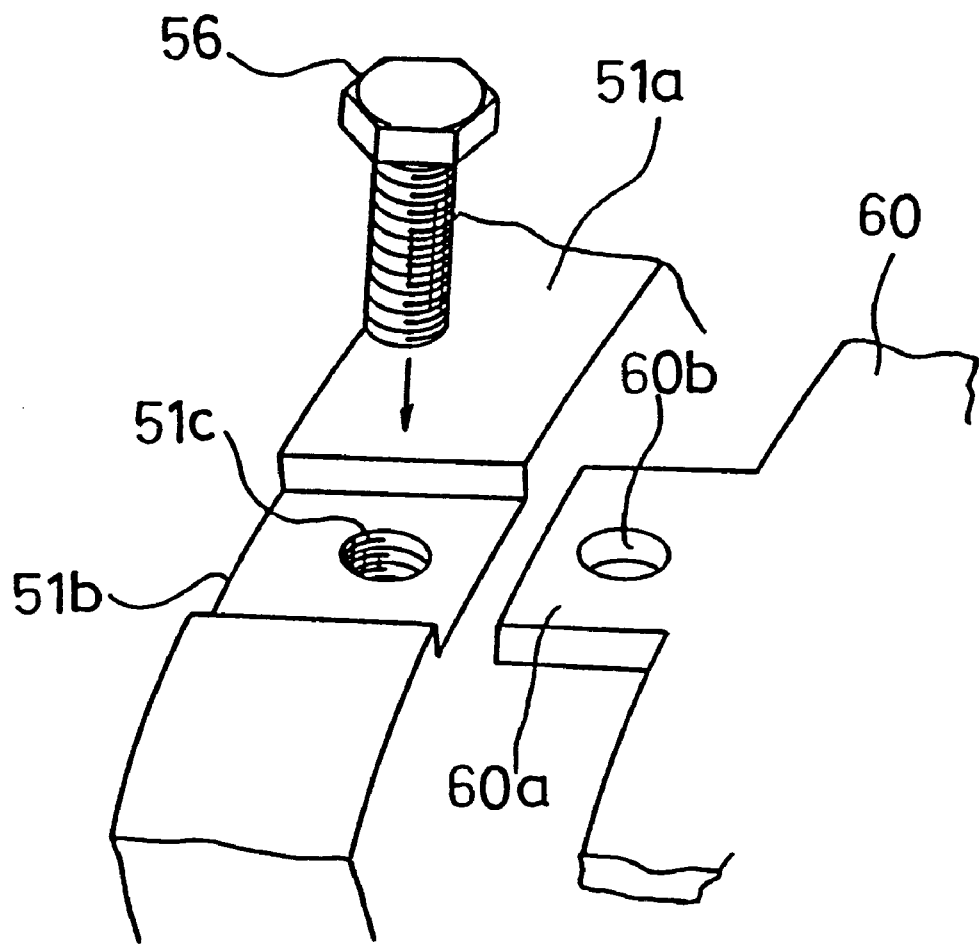
FIG. 9 is a perspective partial view of the clutch construction.

The clutch cover 60 is formed as a dish and has a large-diameter central hole. The peripheral wall of the clutch cover 60 extends axially engine-ward, and portions thereof are in further extension, forming tenon portions 60a, as shown in FIG. 9. The tenon portions 60a are formed at fixed radial intervals and each has a central hole 60b. The tenon portions 60a are each engaged with the corresponding mortise portions 51b of the flywheel 51 and fixed by bolts 56.

The diaphragm spring 61 is an annular disc concentric with the clutch cover 60. Its radially middle portion is supported by the clutch cover 60 through wire rings 63, and its radially outer portion elastically compels the pressure plate 62 toward the flywheel 51, pressing on a plurality of projecting portions 62b thereof. The radially inner margin of the diaphragm spring 61 is pushed by a release assembly 14, wherein when the release assembly 14 presses the radially inner margin of the diaphragm spring 61 toward the engine (toward the left in the figure), clutch engagement is released.

Next, the assembly procedure of the clutch construction will be explained.

First, the diaphragm spring 61 and the pressure plate 62 are installed into the clutch cover 60, whereby the clutch cover assembly 52 is assembled. The clutch assembly 53 is also assembled. Then, the clutch disc assembly 3 is set into the clutch cover assembly 52, and likewise is the flywheel 51, by engaging the tenon portions 60a of the clutch cover 60 into the mortise recesses 51b thereof. At this time, the rim of the peripheral wall 60, apart from the tenon portions 60a, comes into abutment against the end face of the flywheel 51, thus determining the relative axial positioning of the two parts. The bolts 56 are then screwed into the tapped holes 51c of the mortise recesses 51b, whereby the clutch cover 60 is fixed to the flywheel 51. The tenon portions 60a of the clutch cover 60 are flattened to the axially flat seats of the mortise recess 51b, wherein seating contact between the mortise recesses and the tenon portions 60a, and furthermore between the tenon portions 60a and the bolts 56, is increased, thereby providing sufficient frictional force.

After the clutch construction is assembled as described above, the flywheel 1 is brought into contact with the flexible plate 4 and the two parts are coupled by together bolts 21. Windows formed in the transmission housing 5 provide access for an assembler to tighten the bolts 21. The flexible plate 54 is previously fixed to an engine crankshaft through bolts 22, after the ring gear 59 has been welded to the flexible plate 54.

This embodiment not only provides enough frictional force between the contact portions, but also prevents the bolts. 56 from breaking. This is because the fastening bolts 56 are seated on tenon portions 60a of the clutch cover 60 which have been inserted into the circumferentially retaining mortise recesses 51b of the flywheel 51. Furthermore, the number of bolts necessary for fixing the clutch cover 60 can be reduced.

[Modification]

The present invention is applied to a push-type clutch in the foregoing embodiment; the present invention can be alternatively applied to a pull-type clutch.

Fourth Embodiment

Figure 10:
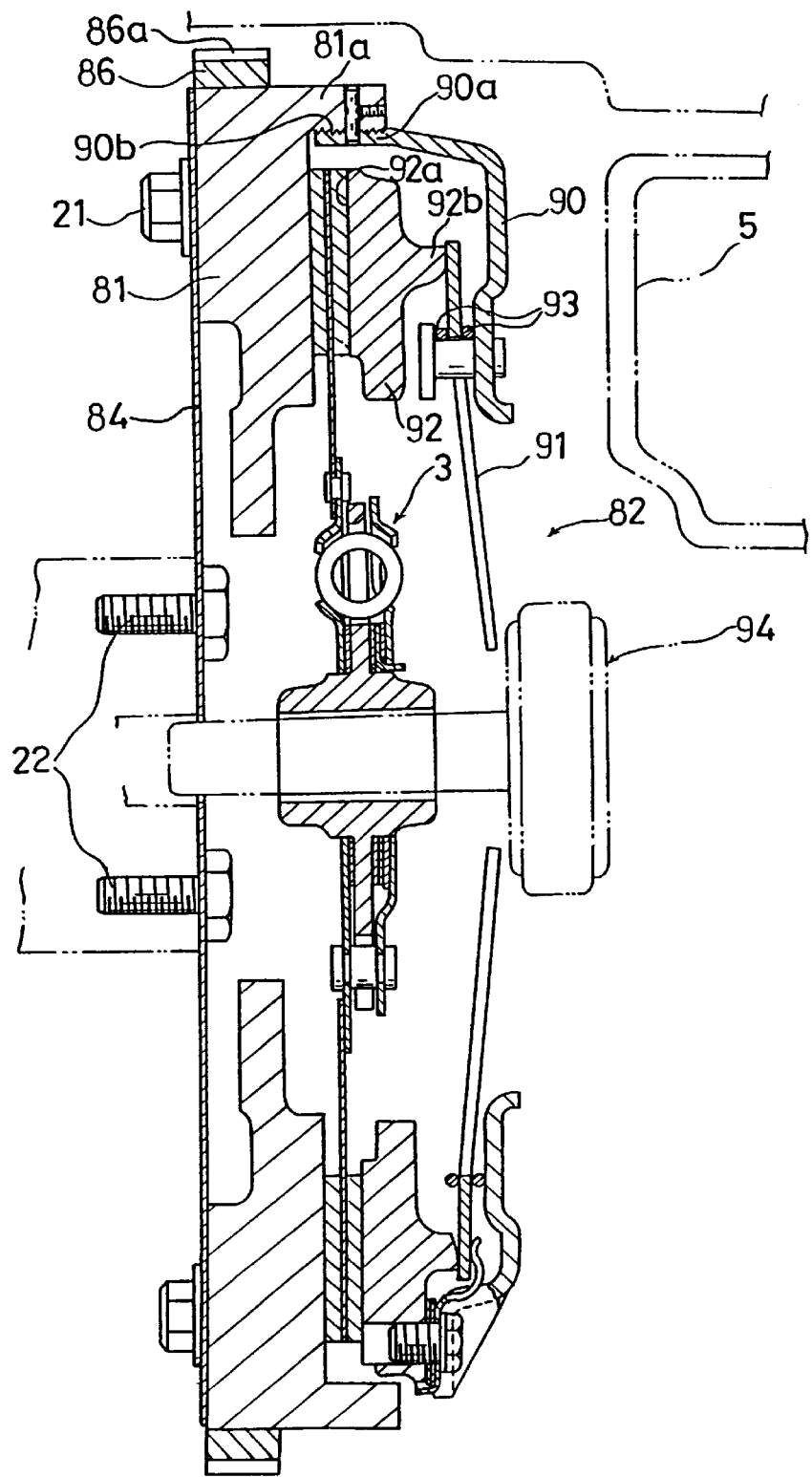
FIG. 10 is a cross-sectional view of a clutch construction according to a fourth embodiment of the present invention.

A modular clutch construction as shown in FIG. 10 mainly comprises a flywheel 81, a clutch cover assembly 82, and a clutch disc assembly 3. A flexible plate 84 is provided on the engine-ward side, for attaching the clutch to the corresponding engine member, the clutch thus being located between the flexible plate 84 and a transmission front housing 5.

Figure 11:
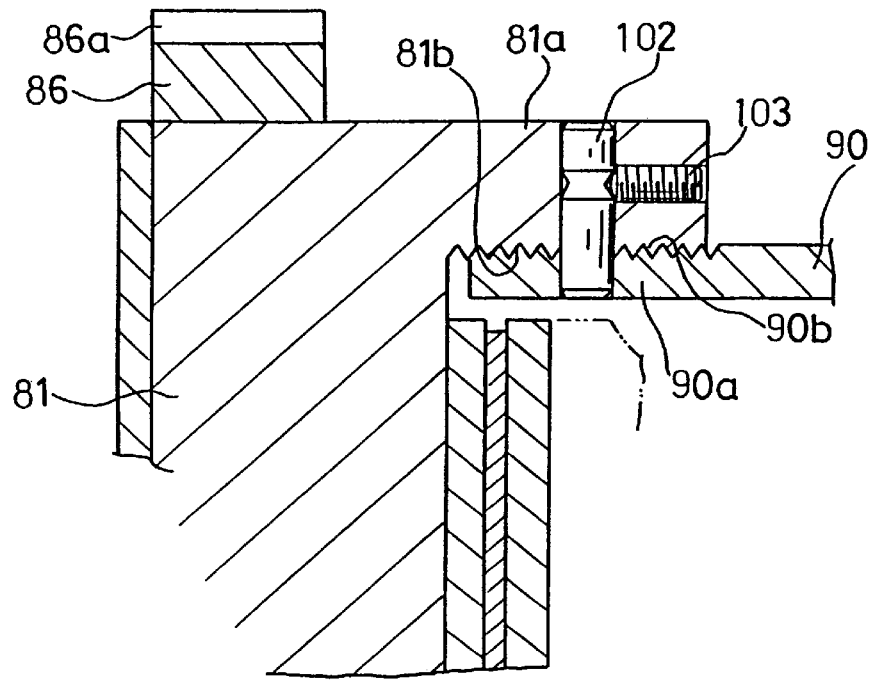
FIG. 11 is an enlarged partial view of the clutch construction.

The flywheel 81 is an annular member, and its engine-ward end face is connected to the flexible plate 84 by bolts 21. The circumferentially peripheral portion of the opposite end face of the flywheel 81 is formed as an axially extending rim 81a. The inner surface of the rim 81a is, as shown enlargedly in FIG. 11, tapped with interior threads 81b for corresponding engagement with the clutch cover 90. The end face of the flywheel 81 radially inward of the rim 81a is a friction surface onto which the clutch disc of the assembly 3 presses.

The clutch cover assembly 82 is composed by a clutch cover 90, coaxially containing a diaphragm spring 91 and an annular pressure plate 92.

The clutch cover 90 is formed as a dish having a large-diameter central hole. The circumferentially peripheral margin 90a of the clutch cover 90 extends axially engine-ward, and is cut with exterior threads 90b for corresponding engagement with the interior threads 81b of the flywheel 81. Provided in the rim 81a of the flywheel 81 and the peripheral margin 90a of the clutch cover 90 are a plurality of radially extending holes, into which whirl-restraint pins 102 are inserted. The whirl-restraint pins each have a circumferential groove into which a set screw 103 is seated, through an axial socket in the crown of the flywheel 81 rim 81a.

Furthermore, a ring gear 86 is shrink-fitted onto the cylindrical surface of the flywheel 81. The ring gear 86 has circumferentially peripheral teeth 86a for engagement with a starter motor pinion.

The diaphragm spring 91 is a disc concentric with the clutch cover 90. Its radially middle portion is supported by the clutch cover 90 through wire rings 93, and its radially outer margin elastically compels the pressure plate 92 toward the flywheel 81, pressing on a plurality of projecting portions 92b thereof. The radially inner margin of the diaphragm spring 91 is pushed by a release assembly 94, wherein when the release assembly 94 presses the radially inner margin toward the engine (toward the left in the figure), clutch engagement is released.

Next, the assembly procedure of the clutch construction will be explained.

First, the diaphragm spring 91 and the pressure plate 92 are installed into the clutch cover 90, whereby the clutch cover assembly 82 is assembled. The clutch disc assembly 3 is also assembled. Then, the clutch disc assembly 3 is set into the clutch cover assembly 82, and thereafter the exterior threads 90b of the clutch cover 90 and the interior threads 81b of the flywheel 81 are matched and the flywheel 81 is screwed in. When the end of the clutch cover 90 bearing the threads 90b comes into contact with the friction surface of the flywheel 81, the clutch cover 90 is backed off until the holes in the clutch cover 90 circumferential margin 90a and those in the rim 81a of the flywheel 81 are in alignment. A pin 102 is inserted into each set of corresponding holes of the rim 81a and the clutch cover 90, and the set screws 103 are accordingly screwed in.

The ring gear 86 is heated and shrink-fitted onto the flywheel 81 cylindrical surface.

After the clutch construction is assembled as described above, the flywheel 1 is brought into contact with the flexible plate 4 and the two parts are coupled together by bolts 21. Windows formed in the transmission housing provide access for an assembler to tighten the bolts 21. The flexible plate 4 is previously fixed to an engine crankshaft through bolts 22, before it is coupled with the flywheel 1.

Because the flywheel 81 and the clutch cover 90 are interlocked by the corresponding threaded portions tapped on the mutual connecting surfaces, bolts or similar fasteners are eliminated by this embodiment. In addition, the clutch cover 90 circumferential margin 90a is restrained by its location inside the rim 81a against radially outward expansion due to centrifugal force.

[Modifications]

Figure 12:
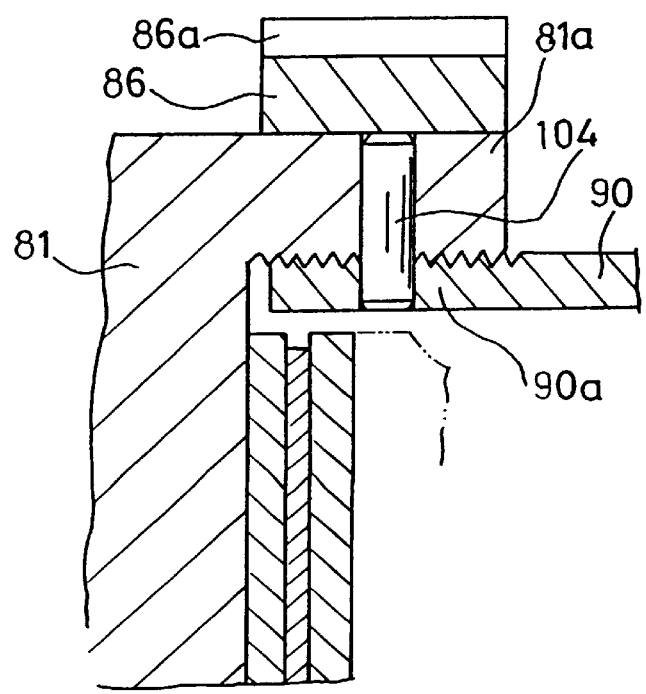
FIG. 12 is a modification of the clutch construction, corresponding to FIG. 11.

(a) As shown in FIG. 12, the ring gear 86 can be shrink-fitted onto the rim 81a of the flywheel 81. In this case the ring gear 86 is attached to the flywheel 81 after the whirl-restraint pins 104 have been installed and the flywheel 81 is fixed to the clutch cover 90. Thus, the ring gear 86 prevents both the clutch cover 90 and the rim 81a from expanding radially outward under centrifugal force; and it contains the whirl-restraint pins 104 from coming out of the rim 81a, eliminating the set screws therefor.

(b) The present invention is applied to a push-type clutch in the foregoing embodiment; however, the present invention can be alternatively applied to a pull-type clutch.

(c) In the embodiment as described above, the rim 81a is circumferentially continuous on the flywheel 81. Alternatively, it can be formed sectorally around the circumference of the flywheel 81 end face.

Various details of invention may be changed without departing from its spirit nor scope. Furthermore, the foregoing description of the embodiments according to the present invention is provided for the purpose of illustration only, and not for the purpose of limiting the invention as defined by the appended claims and their equivalents.

What is claimed is:

1. A method for assembling a modular clutch construction, comprising:

providing a flywheel comprising (i) a first end face, a second end face opposite to the first end face, and an axially protruding portion around a circumferential periphery of the second end face; (ii) a clutch cover assembly comprising a pressure plate and a clutch cover having a peripheral wall axially extending over the pressure plate; and (iii) a clutch disc assembly;

configuring the flywheel the clutch cover assembly, and the clutch disc assembly, so that the clutch disc assembly is coaxially disposed between the second end face of the flywheel and the pressure plate, and so that the pressure plate faces the second end face of the flywheel; and engaging a radially inner surface of the flywheel protruding portion and a radially outer surface of the clutch cover peripheral wall, wherein the radially inner surface of the flywheel protruding portion and the radially outer surface of the clutch cover peripheral wall have threads on their surfaces to engage with each other, and the engaging step comprises a step of matching and screwing the threads of the inner surface of the flywheel protruding portion into the threads of the outer surface of the clutch cover peripheral wall by rotating either of the flywheel or the clutch cover assembly, wherein a plurality of radially extending holes are formed in the flywheel protruding portion and correspondingly in the clutch cover peripheral wall, and the engaging step comprises a step of inserting a plurality of pins into each of the holes.

2. The method as defined in claim 1, wherein a each of the plurality of pins has a circumferential groove, a plurality of axially extending holes are formed in the flywheel protruding portion, and the inserting step comprises screwing a plurality of screws into each of the plurality of axially extending holes to secure the pins at the circumferential groove of the pin inserted into the radially extending holes.

3. The method as defined in claim 1, wherein the providing step further comprises a ring gear, and the method further comprises a step of shrink-fitting the ring gear onto a radially outer surface of the flywheel protruding portion.

4. The method as defined in claim 3, wherein the shrink-fitting step shrink fits the ring gear over the plurality of pins.

5. The method as defined in claim 1, wherein the providing step further provides a flexible plate, and the method further comprising a step of mounting the flywheel to an engine crankshaft through the flexible plate on the first end face of flywheel.

* * * * *

UNITED STATES PATENT AND TRADEMARK OFFICE
CERTIFICATE OF CORRECTION

PATENT NO. : 6,142,279
DATED : November 7, 2000
INVENTOR(S) : Hiroshi Teramae and Masaaki Asada It is certified that error appears in the above-identified patent and that said Letters Patent is hereby corrected as shown below:

On the title page: Item [75] Inventors, please delete Koji Kajitani, Hiroshi Takeuchi and Yasunobu Fukatani.

Signed and Sealed this

Twelfth Day of June, 2001

*Attest:*

*Attesting Officer*

NICHOLAS P. GODICI
*Acting Director of the United States Patent and Trademark Office*